United States Patent
Brady

[19]

[11] Patent Number: 5,970,132
[45] Date of Patent: *Oct. 19, 1999

[54] CALL DISTRIBUTOR

[75] Inventor: Patrick K. Brady, Downers Grove, Ill.

[73] Assignee: Apropros Technology, Oakbrook Terrace, Ill.

[*] Notice: This patent is subject to a terminal disclaimer.

[21] Appl. No.: 08/827,685

[22] Filed: Apr. 10, 1997

Related U.S. Application Data

[63] Continuation of application No. 08/758,063, Nov. 27, 1996, Pat. No. 5,724,418, which is a continuation of application No. 08/595,861, Feb. 6, 1996, abandoned, which is a continuation of application No. 08/450,268, May 25, 1995, Pat. No. 5,557,668, which is a continuation of application No. 07/904,196, Jun. 25, 1992, abandoned.

[51] Int. Cl.$^6$ .................................................. H04M 3/58
[52] U.S. Cl. ........................ 379/212; 379/265; 379/266; 379/210; 379/211
[58] Field of Search ................................. 379/212, 265, 379/266, 210, 211, 113, 225, 226, 267, 309, 157, 162, 163, 164, 165

[56] References Cited

U.S. PATENT DOCUMENTS

| | | | |
|---|---|---|---|
| 4,289,934 | 9/1981 | Pitroda et al. | 379/269 |
| 4,694,483 | 9/1987 | Cheung | 379/165 |
| 4,785,408 | 11/1988 | Britton et al. | 379/77 |
| 4,894,861 | 1/1990 | Fujioka | 379/217 |
| 4,942,602 | 7/1990 | Baker, Jr. et al. | 379/62 |
| 4,949,373 | 8/1990 | Baker, Jr. et al. | 379/212 |
| 4,972,461 | 11/1990 | Brown et al. | 379/67 |
| 5,001,710 | 3/1991 | Gawrys et al. | 379/265 |
| 5,008,930 | 4/1991 | Gawrys et al. | 379/212 |
| 5,036,535 | 7/1991 | Gechter et al. | 379/265 |
| 5,097,528 | 3/1992 | Gursahaney et al. | 379/67 |
| 5,134,652 | 7/1992 | Brown et al. | 379/163 |
| 5,144,653 | 9/1992 | Masuoka | 379/309 |
| 5,168,446 | 12/1992 | Wiseman | 705/37 |
| 5,168,515 | 12/1992 | Gechter et al. | 379/265 |
| 5,181,239 | 1/1993 | Jolissaint | 379/266 |
| 5,210,789 | 5/1993 | Jeffus et al. | 379/267 |
| 5,214,688 | 5/1993 | Szlam et al. | 379/112 |
| 5,247,569 | 9/1993 | Cave | 379/113 |
| 5,329,583 | 7/1994 | Jurgensen et al. | 379/266 |
| 5,402,474 | 3/1995 | Miller et al. | 379/93 |
| 5,557,668 | 9/1996 | Brady . | |

OTHER PUBLICATIONS

Borton, George F. Request and Status Links—A New Way to Link Computers and PBXs, Feb. 1990 Business Communications Review, pp. 29–33.

Borton, George F. Switch to Computer Links: The First Two Years, Mar. 1992 Business Communications Review, pp. 27–31.

*Primary Examiner*—Daniel S. Hunter
*Attorney, Agent, or Firm*—Crowell & Moring LLP

[57] ABSTRACT

An improved call distribution system is provided for distributing calls and information relating to the calls to different stations serviced by telephones and computers. The call distribution system comprises one or more telephone lines, with or without a PBX or an ACD, a first telephony interface device connected to a computer and to the telephone lines, a second telephony interface device connected to the telephone lines, a call control process that controls the telephony functions on the first telephony interface device, a telephony interface process that controls the telephony functions on the second telephony interface device, and an interprocess message dispatch system that is used to send messages between the call control process and the telephony interface process.

62 Claims, 7 Drawing Sheets

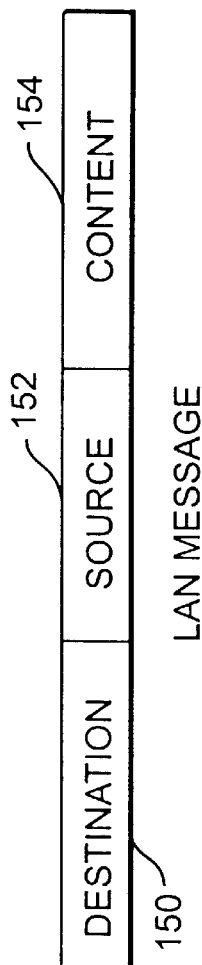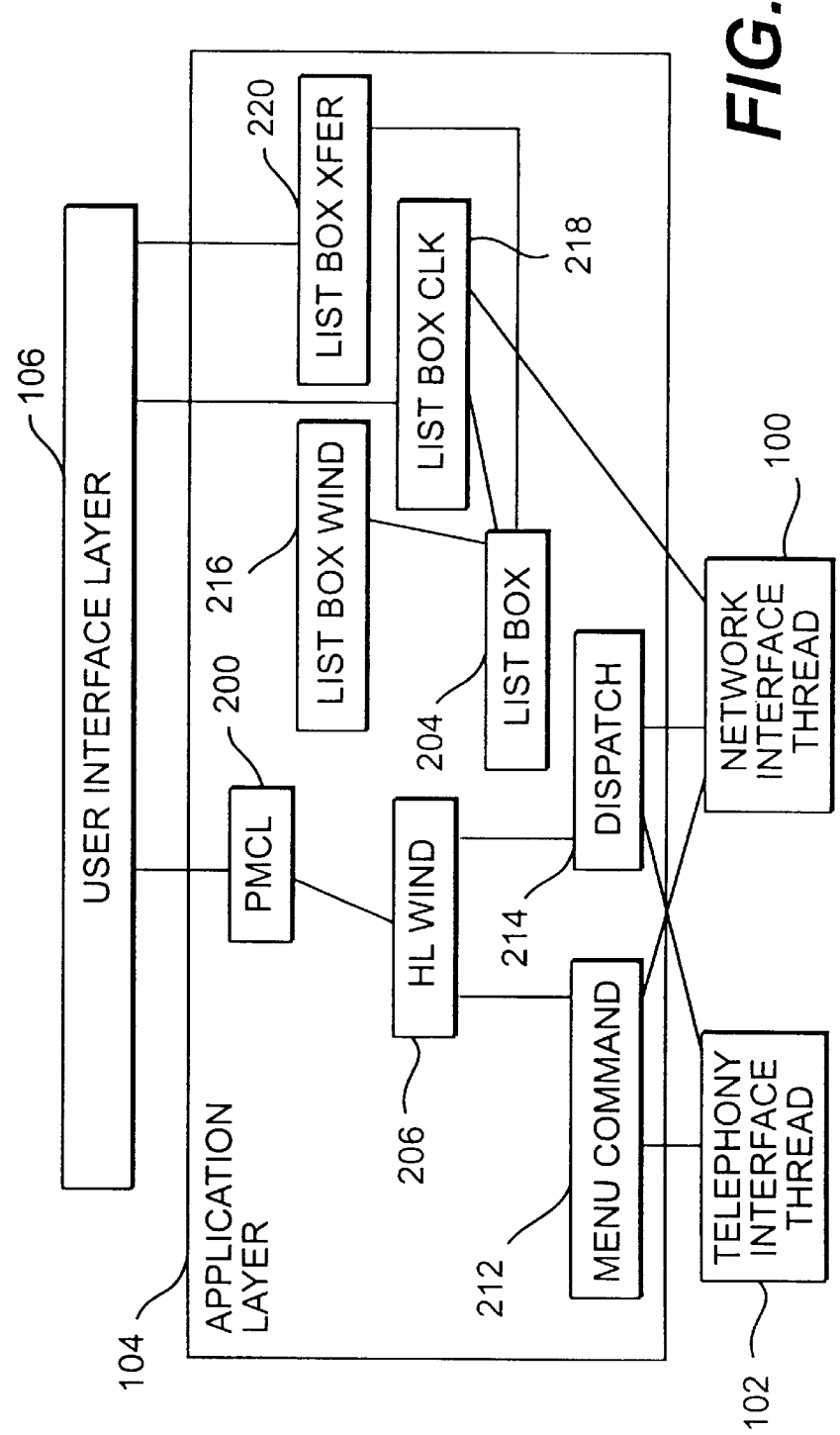

CALL DISTRIBUTOR

This application is a continuation of application Ser. No. 08/758,063, filed Nov. 27, 1996, now U.S. Pat. No. 5,724,418, which is a continuation of application Ser. No. 08/595,861, filed Feb. 6, 1996, now abandoned, which is a continuation of application Ser. No. 08/450,268, filed May 25, 1995, now U.S. Pat. No. 5,557,668, which is a continuation of application Ser. No. 07/904,196, filed Jun. 25, 1992, now abandoned.

FIELD OF THE INVENTION

This invention relates to a novel call distribution system that can be implemented in any telephonic environment with all existing equipment. In one aspect, it relates to a system for integrating telecommunications systems and information systems to provide an improved system for simultaneously distributing calls and information.

BACKGROUND

Private branch exchanges (PBXs) and other call switching devices receive incoming telephone calls to an establishment and distribute the calls to available agents at the establishment. However, sophisticated call distribution involving facilities such as multiple caller queues for servicing multiple categories of callers is only available at the cost of acquiring large amounts of expensive and specialized equipment. For example, automatic call distributors can handle large numbers of incoming and outgoing calls simultaneously, and they can manage calls by holding them in queues until an agent is available to receive the call. These systems are expensive to install and expensive to modify.

Many of the users of call switching systems use them to distribute calls to banks of agents who respond to callers' requests with the help of application programs developed at the user's establishment. These application programs typically operate on host computers and are used to organize and process large databases of information related to the business, customers and/or market of the user. The functions provided by these application programs include responding to agent inquiries to send data in a particular format or responding to requests for information on particular subjects or items. Users also can use application programs to tailor-make the agent's interface with the application program for displaying the information necessary for the agent to handle the calls he or she receives. Users also use the application programs for performing statistical and other analyses on the data that are uniquely suited for the user's business.

In the past, it was difficult to integrate a telephone call with the data that related to the purpose of the call or the identity or business of the caller. Agents using application programs were forced to request information from a host computer running the application program only after receiving the telephone call from the PBX and obtaining key information from the caller. This procedure was time-consuming, and prone to errors. Furthermore, if the agent transferred the call, the data obtained from the host computer could not be transferred with the call and was lost.

Recently, one proposed solution to the problem of voice/data integration has been the use of Request and Status Links (RSLs) linking an ACD or a PBX and the host computer. The RSL includes a piece of hardware providing a physical channel between, for example, an ACD and the host computer and software providing one interface between the host computer and the RSL and another interface between the ACD and the RSL. While allowing the host computer to transfer data to agents at the same time as the ACD transfers the call, this approach suffers from several constraints. For example, in order to protect the secrecy of the ACD's software, and leverage the investment in ACD software, RSLs impose call handling protocols on RSL requests that impose constraints on the host computer's access to the RSL's services. A considerable amount of customization to the host's operating system, host hardware and telephone equipment is required by users of RSLs. Frequently an RSL installation requires special hardware that is often incompatible with existing equipment. This incompatibility sometimes necessitates extensive and costly upgrades of the equipment, including the ACD itself.

An RSL installation also requires extensive re-configuration of the user's application programs running on the host computer to allow for coordination of call and data transfer. This reconfiguration can be extremely expensive and time consuming and must be done very carefully, because the application programs very often constitute the user's most valuable asset. Furthermore, each RSL only works on particular models of automatic call distributors, requires digital telecommunication technology, and must adhere to rigid, often proprietary, protocols. Furthermore, purchasers of RSLs often cannot add additional features without a great deal of effort, specialized knowledge and extensive testing.

A proposal for more flexible RSL-type systems is to use an international standard such as Integrated Services Digital Network (ISDN). ISDN allows for moving data and voice over the same path through the telephone lines. If an establishment uses ISDN compatible equipment, it can add other equipment, including additional ACDs and stations, without significantly changing its original system, provided the added equipment also conforms to ISDN. However, ISDN suffers from many deficiencies, including requiring a slow transmission speed of 144 kb/second (maximum). Furthermore, most existing systems are incompatible with ISDN. Consequently, ISDN does not avoid the extensive upgrade costs associated with RSLs in general.

SUMMARY OF INVENTION

The present invention is a system for distributing calls using any computer or network of computers and any switching device, PBX, automatic call distributor (ACD), analog or digital telephone line or analog or digital telephone trunk by providing a controller for each telephone line that can send messages describing the state of its line to all other telephone line controllers in the system. The controller provides telephony functions including the ability to hold the calls pending action by the other controllers in the system. The invention provides for integration of voice and data with no need for rewriting the application programs maintained on host computers. The system does not impose rigid proprietary protocols but is easily adaptable to any environment, and can run at any speed. Consequently, any phone system, whether digital (including ISDN) or analog, can support the call distribution system of the present invention.

In one embodiment of the invention, the call distribution system comprises control processes running on personal computers (PCs) connected to each other by a network, each PC having a telephony interface card connected to lines on the PBX, ACD or incoming line or trunk, and a message router resident on the network that routes messages among the call control processes running on the PCs. Each PC's telephony interface card communicates with the rest of the system via the control software running on the PC. The message router allows the PCs to answer calls and receive information about the calls. The control processes running on the PCs answer calls, hold calls, and transfer calls by sending messages to the telephony interface cards. Each control process running on a PC informs all other control processes of the key state of its telephone line and which calls it is answering by broadcasting messages via the message router. The control processes request transfers, accept transfers, and accept calls from others PCs on the network by sending an appropriate message to the message router, which in turn dispatches the message to the control process holding the call. The control processes can also access information originating from a data base resident on the network.

In this embodiment of the invention, there are two classes of PC and two classes of control process. A first class of PC runs multiple call control processes and is connected to multiple telephony interface cards. There is a separate call control process for each telephony interface card. Each incoming call is first received by a telephony interface card connected to this first PC. The call control process associated with a telephony interface card that receives the incoming call performs voice response activities and posts the call onto a list of callers.

The second class of PC is an agent's PC. These PCs run the second class of control process, called a line control process, and are each connected to a single telephony interface card. The agent selects calls to answer from the list of callers. When the agent makes such a selection, the telephony interface card connected to the first class of PC transfers the call to the telephony interface card connected to the agent's PC. The line control process on the agent's PC controls the telephony interface card connected to the agent's PC.

In another embodiment of the invention, the call distribution system comprises control processes running on a host computer or server computer along with the application program in a multi-tasking environment. The message router also runs on the host computer and communicates with the control processes using interprocess communication mechanisms provided by the operating system of the host computer. The control processes communicate with telephony interface devices that receive calls and perform telephony functions such as dialing, answering and transferring. The message router may have access to the information in a database, and may be able to send information to the application program. The application program displays the information on terminals located at agents' desks. Each agent also has a headset connected to one of the telephony interface devices. The message router sends the information to the application program for display on the agent's terminal at the same time the agent receives the call.

BRIEF DESCRIPTION OF THE DRAWINGS

FIG. 3 shows a schematic of an interprocess message.

FIG. 4 shows a more detailed schematic of the software running on the PC showing the communication links between the processes and subprocesses.

DETAILED DESCRIPTION OF THE INVENTION

Figure 1:
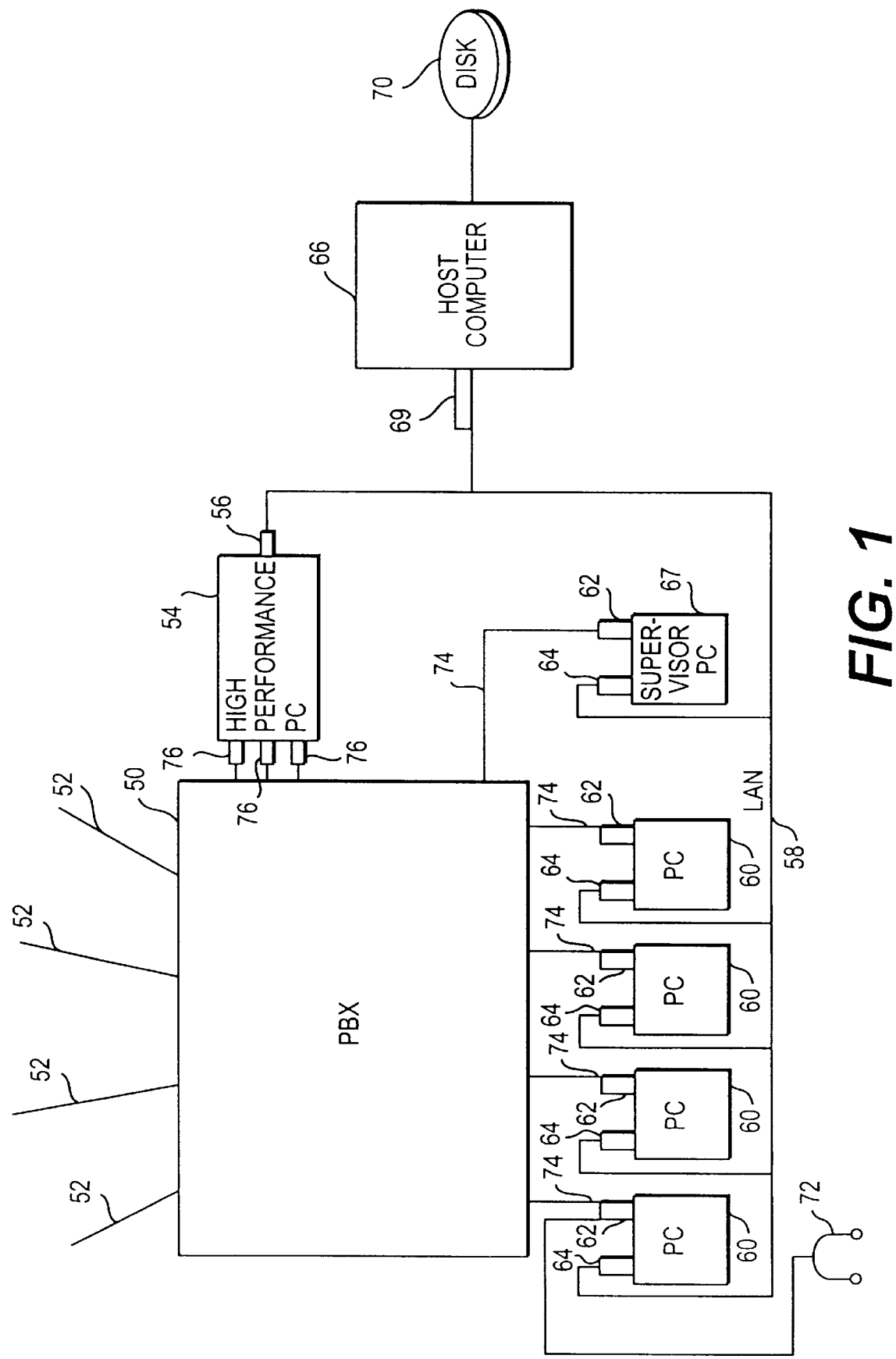
FIG. 1 shows a schematic of a first embodiment of the call distribution system of the invention comprising a local area network and telephony interface cards, showing the hardware connections between the components of the system.

In one embodiment of the invention, shown in FIG. 1, a PBX 50, serving one or more telephone lines 52 is connected to multiple telephony interface cards 62 and 76. In this embodiment, the telephone lines 52 are any lines that come from a central office or Centrex maintained by the telephone company. The telephony interface cards (TIC) 62 and 76 are telephony interface devices consisting of boards that plug into the main board of an IBM compatible personal computer to provide the personal computer access to telephony functions. One such board, the VBX100, manufactured by Natural Microsystems, is a device that has a telephony connection with the PBX, for example an analog tip and ring connection, and which provides measurement and control through relays and a digital signal processor. In other embodiments, the telephony interface cards 62 and 76 establishes a telephony interface with the PBX using other types of telephony connections, such as T1 or ISDN. The telephony interface device can be any device that can establish a telephony connection with the telephone line or PBX, and provide telephony functions such as dialing, answering, and receiving and transmitting signals, such as voice signals, over the telephone line 74 or 52. It also must be able to establish a data and control connection with the rest of the system and provide for control of its telephony functions via its data and control connection.

In the embodiment under consideration, the telephony interface cards 62 and 76 have resident firmware and memory for downloadable programs. Access to the telephony interface cards 62 is made through a data and control connection to the PC 60. Access to the telephony interface cards 76 is made through a data and control connection to the high performance PC 54. In this embodiment access is made through a standard AT bus. Any type of data connection, such as RS-232 or other serial or parallel standards may be employed. All telephony functions, such as loop-current detection or sending touch-tones are provided by the telephony interface controller cards 62 and 76.

The telephony interface cards 76 are connected to another PC 54, which is preferably a high performance personal computer (PC). This PC 54 also has a network port 56, such as another network interface card, to a Local Area Network (LAN) 58. The high performance PC 54 is in one embodiment an IBM compatible PC running a fast processor such as an Intel 80486 microprocessor. Although a high performance PC is desirable, the system could use, in place of the high performance PC 54, any computer capable of connecting to telephony interface cards 76 and the LAN 58. If an implementation of the invention requires more telephony interface cards 76 than can be accommodated by a desired high performance PC, multiple high performance PCs can be used, each high performance PC having a set of telephony interface cards 76 and each high performance PC having a data connection to the LAN 58. The LAN 58 also has links to one or more personal computers (PCs) 60, each equipped with a telephony interface card 62, for communicating with the PBX 50, and each equipped with a network interface card 64 for communicating with the LAN 58. Telephony equipment, such as a headset 72, is connected to the telephony interface card 62. Incoming calls are first received by the telephony interface cards 76 which hold the calls until an agent operating a PC 60 and using a headset 72 is available to receive the call. Before a call is transferred, the telephony interface card 76 may send audible voice messages to the caller and elicits touch tone digit responses from the caller. The information contained in the digit responses is received by a CCP process 254 and can be used to decide which agent should receive the call, or can be used to obtain from a database information that pertains to the caller's identity or to the purpose of the call, or other information. All or part of this database information may be passed to a PC 60 at the time its agent receives the call.

The incoming phone lines 52 are received by the PBX 50 in the embodiment under consideration; however, a PBX is not required for the use of the invention. The PBX may be configured according to analog or digital protocols, including ISDN protocols. The system of the invention is adaptable to any standard or protocol. In one embodiment, analog protocols are used.

The preferred operating system running on the PCs 60 is an operating system that provides for multi-tasking, such as the IBM OS/2 operating system. Other multi-tasking, or non-multi-tasking operating systems may also be used. Any computer can be used and the invention is not restricted to IBM compatible PCs or even to personal computers.

The network interface card 64 is, in the embodiment under consideration, an ethernet standard networking device. Several device driver programs can be used to control low level access to the network interface controller card 64, including, but not limited to Novell's NE1000 board device, Novell's named pipe device driver and Novell's requester for OS/2 driver. The LAN 58 is also connected to a network interface card 69 that is connected to a host computer 66 running an application program which controls access to and retrieval of information from a data base optionally stored on a storage device 70. The agent's PCs 60 each run a session of this application program that communicates with the server or host application program over the LAN 58.

Figure 2:
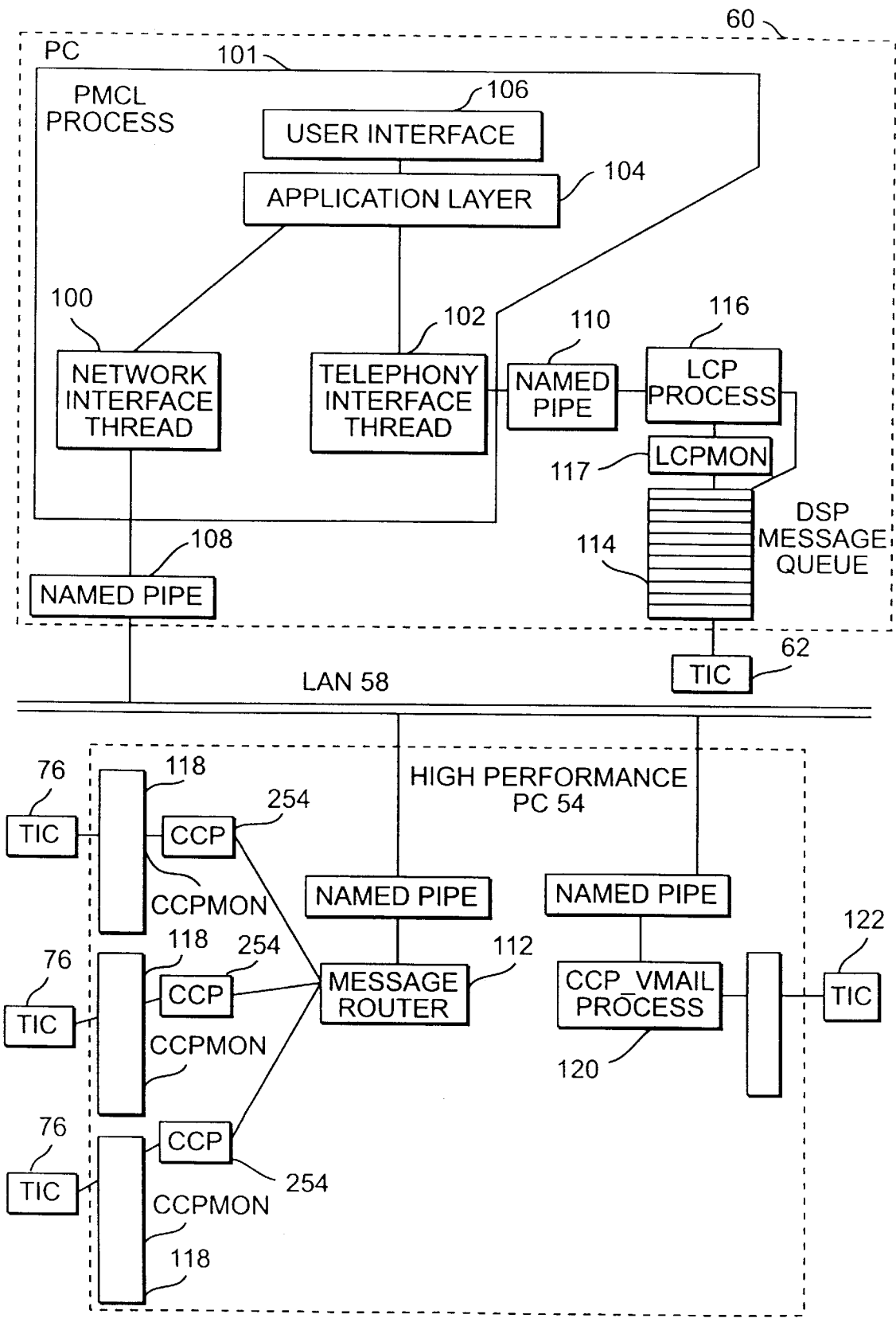
FIG. 2 shows a schematic of the software running on a PC and on the high performance PC in the embodiment of FIG. 1, and the communication links and other connections between the software modules of the system.

FIG. 2 shows the software running on each of the PCs 60 and on the high performance PC 54 in the embodiment illustrated in FIG. 1. The Presentation Manager Control (PMCL) process 101 includes functions for managing network and telephony communications. The network interface thread 100 controls the network interface card 64 of FIG. 1 and the telephony interface thread 102 sends messages to the LCP process 116 for control of the telephony interface card 62 of FIG. 1. The application layer 104 handles the transmission of messages between the user interface 106 and the network interface thread 100 and between the user interface 106 and telephony interface thread 102, and can include implementation specific software for formatting, organizing and collecting information from databases, or for creating messages for retrieving information from and storing information in the data base.

The user interface is preferably a graphical user interface and is more preferably a graphical user interface supporting multi-tasking. In one embodiment of the invention the graphical user interface is the Presentation Manager provided by the IBM OS/2 operating system, but those of ordinary skill in the art will know that other interfaces will also work with the present invention. Other interfaces are equally adaptable to the present invention, such as command-line interfaces, other kinds of graphical user interfaces including those providing mouse cursors or cursors controlled by key-strokes.

In some embodiments of the invention, one or more of the PCs 60 will not be used by an agent, but will instead run an application program that interacts directly with the caller's touch tones. On these PCs, a user interface is not necessary.

The device driver programs described above that control low level access to the network interface controller card 64 are a level below the network interface thread 100. In the embodiment under consideration, the network interface thread 100 is a thread created by the application layer 104. A thread is a child process that does not require initialization of system resources, such as memory and ports, during the thread's own initialization process. Instead, a thread can use the system resources of its parent process. The network interface thread 100 provides for communication to the other PCs 60 on the LAN 58, and provides each PC 60 with access to the information in the database maintained by the host computer 66. The network interface thread 100 sends and receives messages from the application layer 104 via shared memory and semaphores. For example, a semaphore is set when a message is to be sent to the application layer 104. The application layer 104 checks the state of this semaphore at certain points in its code. When the application layer 104 finds a semaphore that is set, it reads from a location in shared memory where the message is stored. When the application layer 104 sends messages to the network interface thread 100, the reverse action takes place, i.e., the application layer 104 sets a semaphore, and the network interface thread 100 responds to the semaphore by reading a message from shared memory. Other types of interprocess communication may also be employed. Preferred methods of interprocess communication are methods provided by operating system software such as the posting method provided by the OS/2 system. These methods shield the programmer from the details of interprocess communication.

The network interface thread 100 in one embodiment of the present invention has an OS/2 named pipe 108 that links network interface thread 100 and the message router 112. The named pipe 108 allows interprocess communication in the OS/2 environment using standard file reading and writing routines. If an environment other than OS/2 is used for the practice of the present invention, persons of ordinary skill in the art will know equivalents for named pipes provided by those other environments for use in interprocess communication. The network interface thread 100 can communicate with other network interface threads running on the other PCs 60 on the LAN 58 and with call control processes (CCPs) 254 running on the high performance PC 54 through the named pipe 108 and the message router 112.

The LCP process 116 is, in the embodiment under consideration, an autonomous process running on each of the PCs 60. The LCP process 116 first initializes the telephony interface card 62 and then polls for messages from the application layer 104 via the telephony interface thread 102 and from the resident firmware and downloadable software running on the telephony interface card 62. The LCP process 116 performs all call control necessary to initiate, answer or transfer a call, such as flashing the switch hook, sensing a dial tone, sending touch tones and hanging up. Messages coming from the firmware and software on the telephony interface card 62 are checked for type and are preferably checked for errors. These messages may result in communication to the application layer 104 or may result in a response by the LCP process 116 itself. The LCP process 116 also polls for and receives messages from the application layer 104 which result in the LCP process 116 controlling the telephony interface card 62 to perform an activity such as hanging-up or sending touch tones. In the embodiment under consideration, the mode of the communication between the LCP process 116 and the telephony interface thread 102 is a named pipe 110. In the same embodiment, the mode of communications between the LCP process 116 and the telephony interface card 62 is a set of message queue commands supplied by Natural MicroSystems, the manufacturer of the telephony interface card 62, and resident on the telephony interface card 62.

In this embodiment, during its initialization the LCP process 116 downloads digital signal processor software onto the telephony interface card 62, opens a named pipe for establishing communications with the application layer 104, and waits for state changes on the telephone line connected to the telephony interface card 62 and for messages coming through the named pipe. The functions on the telephony interface controller card 62 provided by Natural MicroSystems create a message queue 114 between the digital signal processor (DSP) software and the LCP process 116. These functions also provide for the creation of a thread 117 for connecting the message queue to the telephony interface card 62 where it can be accessed by the digital signal processor software. The initialization portion of the LCP process 116 initiates creation of the thread 117 by passing a function pointer to the Natural MicroSystems software that creates the thread. The thread 117, called the Line Control Process Monitor (LCPMON), alternately reads from the named pipe 110, checks the digital signal processor message queue 114, and sleeps for 40 ms. Messages from the application layer 104 are received by the telephony interface thread 102 which writes them to the named pipe 110. If the LCPMON thread 117 receives a message from the named pipe 110, it converts it to a message in the format of the digital signal processor message queue 114, and puts the re-formatted message into the digital signal processor message queue 114, thus passing the message to the LCP process 116 which is waiting for messages from the LCPMON thread 117. If it encounters an incoming message on the DSP message queue 114, it moves the message to the top of the queue for reception by the LCP process 116.

In the embodiment under consideration, the LCP process 116 itself is a simple finite state machine that responds to messages appearing on the top of the digital signal processor message queue 114 in the context of its current state. For example, in one embodiment of the invention the telephony interface controller module 102 has two states: Idle and Answer. The receipt of an ONHOOK message during the Idle state is ignored, while the receipt of an ONHOOK message during the Answer state results in idling of the call and movement of the LCP process 116 to the Idle state. In other embodiments of the invention, the telephony interface controller module 102 can have additional states, such as Hold or Dial, or other states that are useful for specific implementations of the invention. For example, if the system of the invention is used for managing and executing financial transactions, a Transaction state could be provided. During the Transaction state, all requests to disconnect would be ignored, or held, until the transaction is completed.

In both the Idle and Answer states there are many digital signal processor message types. The five most important message types are as follows. The ONHOOK and OFFHOOK message types are sent when the state of the line connecting the telephony interface card 62 to the PBX 50 changes from off to on hook or vice-versa. The LCLONHK and LCLOFFHK message types are sent when the user hangs up or answers the user's telephone. The RNGBEG message type indicates that the telephony interface card 62 has received a ringing current. The WM_XFERCALL and WM_DSCNNCT are message types that are sent by the application layer 104 in response to agent-initiated actions such as call transfer or disconnect. The minor message types comprise error messages which are handled by cleanup and reentering the Idle state. Cleanup includes re-initializing the local variables of the LCP process 116 and preparing the telephone line 52 and the extension line 74 for error recovery. For example, the LCP process 116 presents a long disconnect to the PBX 50 by calling a function to cause the telephony interface card 62 to go onhook. Immediately thereafter the LCP process 116 calls another function to cause the telephony interface card 62 to mute the headset, thus preventing loud noises from being transmitted to the agent.

The preferred method of implementing the LCPMON thread 117 is to create it once at the time the DSP software is downloaded to the telephony interface card 62. However, in some configurations this method is unavailable because of interference from the firmware on the telephony card 62. In these configurations, the LCPMON thread 117 is created after each time the LCP process 116 enters a new state, and is destroyed just before the LCP process 116 leaves a state.

The CCP processes 254 control the telephony interface cards 76 card and are similar to the LCP processes 116. The message router 112 has message ports with all processes that can send messages over the LAN 58 including the CCP processes 254. A message port is a communication channel that allows a process to send messages to and receive messages from the message router 112. The message port can exist between a process running on the same computer as the message router 112, in which case it can be shared memory and semaphores or a named pipe. Alternatively, the message port can exist between the message router 112 and a process running on a different computer connected to the LAN 58 in which case a named pipe is used. The message router 112 reads incoming messages from the named pipe 108 that belongs to the network interface thread 100. Each message is configured, for example, as in FIG. 3 and comprises a destination field 150, a source field 152 and a content field 154. The message router 112 reads and responds to the destination field of a message by sending the message to the named pipe 108 belonging to the network interface thread 100 indicated by the value stored in the destination field. Thus, each PC 60 needs only one network interface controller module 100 and only one named pipe 108 to communicate with all other PCs 60 on the LAN 58, but more named pipes may be provided for purposes known to those having ordinary skill in the art. The network interface thread 100 can send messages for broadcast to all network interface threads on the LAN 58 by sending a message of a special form, as will be discussed fully below.

In other embodiments of the invention, no message router 112 is unnecessary. In these embodiments, each network interface thread 100 has access to information providing a correlation between the network addresses of each PC 60 and the telephone extension numbers for each telephony interface card 62 and a correlation between the message ports for each CCP process 254 and its associated telephony interface card 76. One method of providing such access is for each PC 60's network interface thread 100 to broadcast to all network interface threads 100 at the time the system starts up the network address of its PC 60 and the extension number of its telephony interface card 62. Whenever a new PC 60 is added to the LAN 58, it will broadcast such a message, and each PC 60 already on the LAN 58 will also repeat its own message to the new PC. In this way each PC 60 knows how to route messages to other network interface threads 100.

Another method for implementing the system of the invention without a message router would be for all messages to be broadcast to all PCs 60 and the CCP processes 254 on the PCs 54. Each network interface thread 100 would then determine whether to process the message. Any other system for dispatching messages between processes may be used. There are many ways of implementing interprocess message dispatch systems known to those having ordinary skill in the art.

The interrelationship between the parts of PMCL process 101 is illustrated in FIG. 4. The top part of the application layer 104 is the group of routines called the PMCL routines 200. The first activity of the PMCL routines 200 is to initialize the network interface thread 100, the telephony interface thread 102 and the resources of the system used by the application layer 104. The PMCL routines 200 are the first point of control for all messages. Agent generated events such as mouse clicks and key strokes, and other events, such as the receipt of a network message, reach the PMCL routines 200 for processing. The PMCL routines 200 may handle the events themselves or pass messages on to other functions in the application layer 104. Below the PMCL routines 200 on the hierarchy of the application layer 104 is the group of routines called the Listbox routines 204. The Listbox routines 204 contain a variety of functions which aid in the processing of user interface activity and call control activity. Listbox functions help carry out the processing steps called by the PMCL routines 200. These functions may open and read files to populate data structures used by the PMCL routines 200, format messages and request them to be sent by the network interface process 102. Listbox functions may also create menus and handle responses from the agent during the menu context. The PMCL routines 200 and the Listbox routines 204 are parts of both the application layer 104 and the user interface layer. Below the Listbox routines 204 is Net thread (NETTHRD), the thread containing the network interface thread 100, and the telephony interface 102 (also called LCPTHRD), the thread for communicating with the LCP process 116.

The PMCL routines 200 starts with an initialization routine PMCL::HLWind( )206 which creates three semaphores and starts the NETTHRD, containing the network interface thread 100, starts the LCPTHRD 208, and starts a third thread, TMRTHRD. TMRTHRD serves as a timer by sending a message to the PMCL routines 200 once every second. The semaphores created by PMCL::HLWind( ) are called Printsem, sema1 and sema2. The Printsem semaphore is used for communication with the process that controls a printer. The sema1 and sema2 semaphores are used to communicate with the network interface thread 100 and telephony interface thread 102, respectively. Other semaphores can be added for communication with other processes as desired, such as a process to control a fax machine.

After initialization is complete, the PMCL routines 200 start two event handling routines: HLWind::MenuCommand( ) 212 and HLWind::Dispatch( ) 214.

The HLWind::MenuCommand( ) event handler 212 responds to menu selections made by the user. Menu selections include requests to hangup the user's telephone line to the PBX, requests to answer an incoming call, requests to transfer a call to another PC on the LAN 58 and requests to accept a call being transferred. The HLWind::Dispatch( ) event handler 214 receives all messages from network interface thread 100 and the telephony interface thread 102. The HLWind::Dispatch( ) event handler 214 thus receives all messages from the LAN 58, since these are passed up by the network interface thread 100. The messages from the LAN 58 include messages for providing identification information about incoming callers, messages indicating that a transferred call is accepted and messages requesting the transfer of a call as well as other messages. The PMCL routines 200 also include routines for repainting the areas of the screen that are uncovered by user mouse action and routines that receive events and messages from other processes and make them accessible to the HLWind functions HLWind::MenuCommand( ) 212 and HLWind::Dispatch( ) 214.

The Listbox routines 204 contain, in the embodiment under consideration, the rest of the application layer 104. They handle all responses to user choices in the list boxes of the user interface. Activities of the Listbox routines 204 include, for example, responding to a user's selection of a caller by sending a message to the CCP process 254 currently controlling the call. This message causes the telephony interface card 76 to transfer the call. The Listbox routines 204 in this embodiment also maintains a timer, which is displayed, to track a call's stay in the queue.

In the embodiment of the invention under consideration, the Listbox routines 204 comprise the following routines. The routine ListBoxWind::ListBoxWind( ) 216 creates the data structures and window used for display of the list of callers, and initializes the timers. The routine ListBoxWind::ListBoxClk( ) 218 responds to a agent's selection from the list of callers by pulling the selected name out of the list and starting the agent's application program. The routine ListBoxWind::ListBoxXfer( ) 220 responds to a agent's request to transfer a call by bringing up a secondary menu containing a list of PC stations or direct dialing digits to which the call can be transferred. Responses to others of the agent's selections from this secondary menu are handled by ListBoxXfer::ListBoxClk( ) 218 which obtains the network address of the selected PC station, formats a transfer message containing the network address and sends the message to the network interface thread 100 for dispatching over the LAN 58 to the selected PC station. The Listbox routines 204 also include a routine for repainting the caller list when uncovered by user mouse picks, a routine for incrementing the timer maintained by the Listbox routines 204, a routine for adding or deleting callers from the list of callers, a routine that puts caller data into messages, and a routine that deletes a selected caller from the caller list.

If one of the named pipes 108 or 110 becomes damaged, for example, by corruption of its local memory, its owner process 100 or 102 simply closes the named pipe and reopens it. This action can be accomplished automatically by the named pipes' owner, or in response to a message sent by another process. For example, a system administration program running elsewhere on the LAN 58, such as on the supervisor PC 67, could send a kill and recreate message in response to a system administration's mouse click or keystroke. The named pipes 108 and 110 can be killed and recreated without starting their owners, the threads 100 and 102. This is accomplished by providing threads that can be initialized only once, and repeatedly re-entered to create the named pipes 108 and 110. This error recovery technique allows repair and recovery of a damaged element of the call distribution system, without requiring that the entire system be shut down.

The remainder of the application layer 104 includes routines that provide the interface between the call distribution system and application programs running on the PC 60. There are several types of these interfaces. In one example, the call distribution system creates a file containing information that is to be used by the application program and stores the file at a location accessible to the application program. When the user starts or enters the application program by actions such as a keystroke or a mouse click, the application program finds the file and processes and displays the information contained therein as appropriate. In another type of interface, the application program automatically polls for the presence of the file created by the call distribution system, and automatically brings up appropriate display screens, without waiting for user action. In a third type of interface, the application program and the call distribution system communicate directly by sending messages via interprocess communications. In a fourth type of interface, the application program could be a terminal emulation program which takes the received messages from the PMCL routines 200, and responds to fields in the messages as if they were keystrokes entered by an agent. Other methods of interprocess communication can be used as well.

FIG. 2 also illustrates the call management and message routing portions of the invention in the embodiment under consideration. The message router 112 is resident on the LAN 58 and receives and routes messages among the processes running on the PCs 60 and the high performance PC 54. In one embodiment of the invention, the message router 112 runs on the processor of the high performance PC 54. In other embodiments the message router 112 runs on the processor of the host computer or on another computer connected to the network. In an embodiment of the invention comprising multiple high performance PCs 54, the message router 112 can run on one of the high performance PCs. The CCP processes running on the other high performance PCs send messages to the message router 112 over the LAN 58.

The message router 112 consists of an initialization section followed by a message processing section. The initialization section links together all the named pipe communication channels 108 running on each of the PCs 60, and allocates an area of interprocessor shared memory for communication with other call control processes running on the processor of the high performance PC 54.

In one embodiment of the invention, the message processing section of the message router 112 is implemented as an infinite loop for checking each named pipe 108 and each shared memory location for messages followed by 20 ms of sleep. If the message router 112 finds a message on one of the named pipes 108, it sends the message to the named pipe 108 indicated by the destination address field of the message. In the embodiment under consideration, the destination address is the telephone extension number of the destined agent. The telephone extension number maps to the ID of the named pipe 108 of the destination PC 60 or a CCP process 254 running on the PC 54, which the message router 112 uses to dispatch the message.

During the infinite loop, the message router 112 also checks each area of shared memory via semaphores. If the message router 112 finds a set semaphore, it processes the message from the high performance PC 54 found in shared memory. First the message router 112 converts the message into the format of the messages sent over the LAN 58. Then the message router 112 sends the message to the named pipe 108 indicated by the destination field of the message. The message router 112 routes messages from named pipes 108 to the high performance PC 54 by setting a semaphore and writing the message to shared memory.

Most messages are point-to-point, i.e., from one process to another. Some messages, however, require broadcast to all network interface processes 100 running on the PCs 60. For example, the messages WM_ANS, which is sent when a user answers a call, and WM_CALL, which is sent when a new incoming call is received, require this type of broadcast so that the lists of pending callers displayed on each PC 60 are accurate and up to date. The message router 112 includes a routine called MsgBrdCst( ) for broadcasting messages. The MsgBrdCst( ) routine loops through a list of named pipes 108 and sends the message to each named pipe 108 on the list, except for the named pipe 108 on the PC 60 that originated the message.

The other processes running on the high performance PC 54 are the call control processes (CCPs) 254. There is a separate CCP process 254 for each telephony interface card 76, but each CCP process 254 is a clone of an original CCP process. The structure of a CCP process 254 is very similar to the structure of an LCP process 116. Like the LCP process 116, the CCP process 254 has an initialization portion and a processing portion. Like the LCP process 116, the CCP processes 254 have an initialization portion that initializes a communications link to a digital signal processor comprising a digital signal processor message queue and a communication thread. The CCP processes 254 communication thread is called CCPMON( ) 118. The CCPMON( ) thread 118 communicates with the message router 112 via the shared memory and semaphores that were discussed above. In the embodiment under consideration, the CCP processes 254 all coreside on the same computer 54; however, in other configurations, the CCP processes 254 can be distributed among different machines, as convenient. Each CCP process 254 should reside on the machine that is connected to the telephony interface card 76 that it controls.

Unlike the telephony interface processes 102, each CCP process 254 can also provide voice response capabilities to the telephone line connected to its telephony interface card 76. When the CCP process 254 completes its initialization phase, it sends voice messages to the caller and receives touch-tone input. The touch-tone responses usually result in application program or database access over the LAN 58. In other embodiments of the invention, the voice response functions can be handled by a separate process from the CCP process 254 itself. The CCP process 254 also handles call transfers to an operator, or entry of the calls into one or more call queues that are implemented by establishing one or more telephony interface cards having telephony connections to the PBX, which are solely for holding calls and do not provide voice response unit functionality. After the CCP process 254 has collected information from the caller, it can transfer the call to one of the holding telephony interface cards until an agent is available.

Queues are established in two ways: 1) The agent's call routines receive messages from the CCP processes 254 and order them based upon criteria such as type of call and age of other calls in the queue. 2) A central queue handler function keeps a table establishing the order for answers. In one embodiment of the invention, the first queue method is employed. The criteria for establishing the PC's queue discipline is obtained from a message called QUEUE_

DISP. The QUEUE_DISP message originates from a supervisor PC 67 connected to the LAN 58, as illustrated in FIG. 1. The QUEUE_DISP message may be transmitted to individual PCs or to all PCs in the system via broadcast. The QUEUE_DISP message contains information to help the PCs 60 decide how to order the incoming new call messages they receive from the CCP processes 254. QUEUE_DISP may, for example, contain a sub field "REASON" which provides acceptance criteria for incoming calls. If, for example, "REASON" was set to "BUYER" in a message sent to one PC 60 and set to "SELLER" in a message sent to another PC 60 then incoming new call messages containing reasons equal to "BUYER" would only show up on the queue of the first PC 60. In this way the supervisor PC 67 has real time control of all stations, on a group or on an individual basis.

The supervisor PC 67 can also control the queuing call distribution method. For example, the QUEUE_DISP messages can contain "FORCED" as the reason. Forced distribution results in calls sent to the most idle agent. In this method, distribution of calls is done not by agent' selections at the agent work stations but automatically by the CCP process 254. A list is maintained of the agents who are idle nd the amount of time they have been in this state. This list is maintained by the adjunct process ACD_MIDLE running in the high performance PC 54. The ACD_MIDLE process uses the WM_DISC message to help establish this list. CCP processes 254 having received the QUEUE_DISP message with "REASON" set to "FORCED" consult the ACD_MIDLE list through shared memory. If no agents are available the call must wait until CCPMON 118 finds a change in the semaphore ACD_MIDLE_SEM. When ACD_MIDLE_SEM is cleared by ACD_MIDLE, CCPMON 118 may begin its transfer.

The CCP process 254 can also implement a queue by holding the calls at the telephony interface cards 76 until an agent is available to receive the call. The ability of the agent processes to maintain queues allows the system of this invention to operate sophisticated call management in conjunction with very simple PBXs, very simple key system groups, or with no PBX or key system group at all. When an agent answers a call in a queue, A WM_GOTANS message is sent to the CCP process 254 which is holding the call. The CCP process 254 then transfers the call by presenting a hook flash to the switching device and transfers the information obtained from the application program or database over the LAN 58 to the PC 60 that answered the call. The session of the application program running on the agent's PC can then use this information. The CCP process 254 then returns to the Idle state and is free to accept new calls again.

When calls are transferred in the analog switching environment the flash timing must be accurately controlled. Analog call transfers typically require a 500 ms onhook condition to be present on the line before secondary dial tone is presented. This hook flash time must be within the tolerances of the switching system to which the telephony interface card 76 is interfaced. These tolerances vary slightly from manufacturer to manufacturer. Flash timing may also vary as a function of the load of traffic on the switch. In times of high traffic the flash may need to be present longer than 500 ms to be accepted by the switch.

In order to make adjustments to the flash timing a field FLASH_TIME is defined in the WM_CALL message. FLASH_TIME is filled in by the CCP process 254. The CCP process 254 determines the value of FLASH_TIME based on the number of calls in the queue. This number is available in the global system variable Num_in_queue. Num_in_queue is incremented by a CCP process 254 whenever a new call reaches the CCP process's telephony interface card 76 and decremented whenever a call is transferred from the CCP process's telephony interface card 76. Num_in_queue is compared against a pragmatically defined equation to determine the Flash_time value. For instance, a particular PBX may require standard 500 ms flash timing except under 80% or greater load. At that load the average flash time jumps to 600 ms. If the maximum value of Num_in_queue is 100 then when Num_in_queue exceeds 79 the value of Flash_time would become 600 ms. Because Flash_time is part of WM_CALL, the entire system can adjust very quickly to switch load.

It is important, also, to ensure calls transferred from the CCP process 254 reach their destination agent's telephony interface card 62. The highest level of control and assurance over this transfer can be achieved by sending and receiving transfer assurance tone (TAT). When each CCP process 254 is initialized it contains a defined variable in memory which contains a unique value. For example, the variable "extension" contains the extension number to which the CCP process's 254 telephony interface card 76 is connected. "Extension" is used to select a unique frequency from a table called ext_to_freq. This frequency is used by the CCP process 254 to generate a tone after the flash and dialed digits of a call transfer. This frequency is also used by the LCP process 116 of the agent receiving the call. The LCP process 116 is passed the value of this frequency in the WM_ANS message. The LCP process 116 waits for RNGBEG, answers, and then listens for the TAT. TAT is sent by the CCP process 254 and received during the first 250 ms after answer by the LCP process 116. The agent does not hear this tone because the headset connection is muted until after the TAT is removed from the line.

Reception of valid TAT by the LCP process 116 provides an additional criteria for accepting the call and additional assurance that the data and voice stay linked. Once TAT is received and validated by the agent LCP process 116 a message (WM_GOTTAT) is sent to the CCP process 254 to finish the transfer (i.e., the CCP process 254 disconnects). If during this interval the CCP process 254 receives busy tone then it will flash to end this transfer attempt and send a WM_CALL_REJ to the agent. This gives the agent an opportunity to re-select this caller from the queue. Receipt of an invalid TAT or no TAT results in a WM_TAT_NAK message sent to the CCP process 254. If the CCP process 254 receives a WM_TAT_NAK message it may take appropriate action such as abandoning the transfer and reissuing the call to the queue.

Transferred calls in some key system groups differ from this scenario. In the key system group scenario the recipient party must dial a pick-up code and a trunk ID number. In this case the recipient party is told which trunk to pick up in the WM_XFERCALL message.

The system of the embodiment under consideration is intended to run indefinitely once it is started, and only needs to be shut down for hardware maintenance, maintenance of operating system software, or major reconfigurations of the call distribution system itself. Other changes, such as changes to the application program running on the host computer 66 or adding or removing PCs 60 or high performance PCs 54 in some configurations, do not require shutting down and restarting the call distribution system.

The initialization process of the embodiment of the invention under consideration begins with the initialization of the CCP router module 112. The next phase of initialization includes the start up of the PMCL routines 101 running on each of the PCs 60. During this phase of initialization, the network interface threads 100 are started and create the named pipes 108 for communication over the LAN 58. During the last phase of initialization, the CCP processes 254 are started. After initialization is complete, the call distribution system is ready to receive and distribute calls and information as described above.

Another application of the invention is to provide remote voice mail access and control. When callers leave a voice mail message for an agent a WM__VMAIL__CALL message is sent from a CCP__VMAIL process 120 operating on a computer connected to the LAN 58 that handles voice mail to the agent through the message router 112. For example, in one embodiment, the CCP__VMAIL process 120 operates on the high performance PC 54, as illustrated in FIG. 2. The WM__VMAIL__CALL message is received by the agent's PMCL routines 101 which prints a message on the screen of the agent's work station informing the agent of the presence of the Voice Mail message. The agent may click on the VM menu item of the user interface and begin a session with the Voice Mail device.

When VM is selected, the PMCL process 101 receives an internal WM__VMAIL message. This message is passed to the LCP process 116 where an outgoing call is placed to the extension of the voice mail where it is answered by a telephony interface card 122 associated with the CCP__VMAIL process 120. (The extension is a parameter stored in a file and is changeable, like all extension numbers, from site to site). Another version of the WM__VMAIL message is formatted by the PMCL process 101 and sent to the CCP__VMAIL process 120. If the CCP__VMAIL process 120 receives a WM__VMAIL message it begins its control dialogue via message passing with the agent over the network 58. If no WM__VMAIL message is received it begins its control dialogue using touch tones.

The agent can listen, play, record, delete, or perform any operation on the voice mail by clicking on menu items in the user interface. When VM is selected, LIST::ListBoxVMail( ) is called by the PMCL routines 200. LIST::ListBoxVMail( ) creates a Listbox containing PLAY__MESSAGE, DELETE__MESSAGE, RECORD__MESSAGE, and END__SESSION. When one of these is selected by the agent a WM__VMAIL message is formatted. One of the fields of the WM__VMAIL message is the "action" field. "Action" tells the CCP__VMAIL process 120 what action to take (play, delete, etc). When an agent has finished his or her session, END__SESSION is selected. A WM__VMAIL message is sent to the CCP__VMAIL process with action set to END__SESSION. Another copy of this message is sent to the agent's LCP process 116 for disconnect.

The system can also provide for operations such as predictive dialing. Predictive dialing is a method of contacting customers comprising outward dialing initially under computer control. If a call results in a busy signal or no answer the computer tries to contact another customer. If a call is answered, the call is transferred to an available agent. The call distribution system of the invention can provide for predictive dialing by providing for the message router 112 to route information regarding the state of agent's phones to a predictive dialing application program resident on the network 58. The application makes outside calls via a telephony interface card under its control. The application program will only place outside calls when there is at least one open agent telephone. When the application program reaches a customer, it transfers the call to an available agent via its telephony interface card and the PBX that is connected to the application program's telephony interface card and the agent's line. At the same time, the application program sends information about the customer to the agent's PC via the message router 112 and the network 58.

Figure 5:
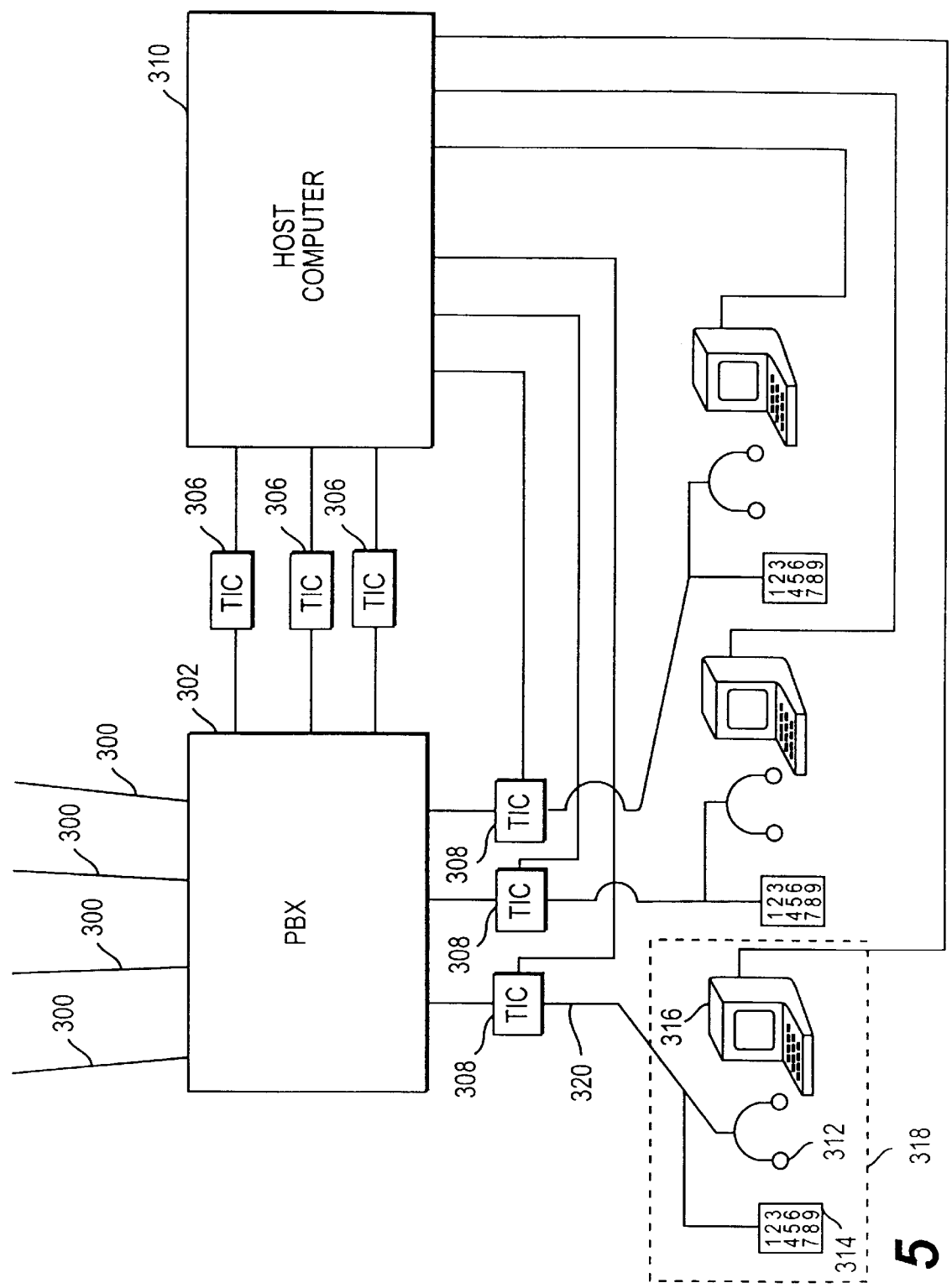
FIG. 5 shows a schematic of a second embodiment of the call distribution system of the invention and shows the hardware connections between the components of the system.
Figure 6:
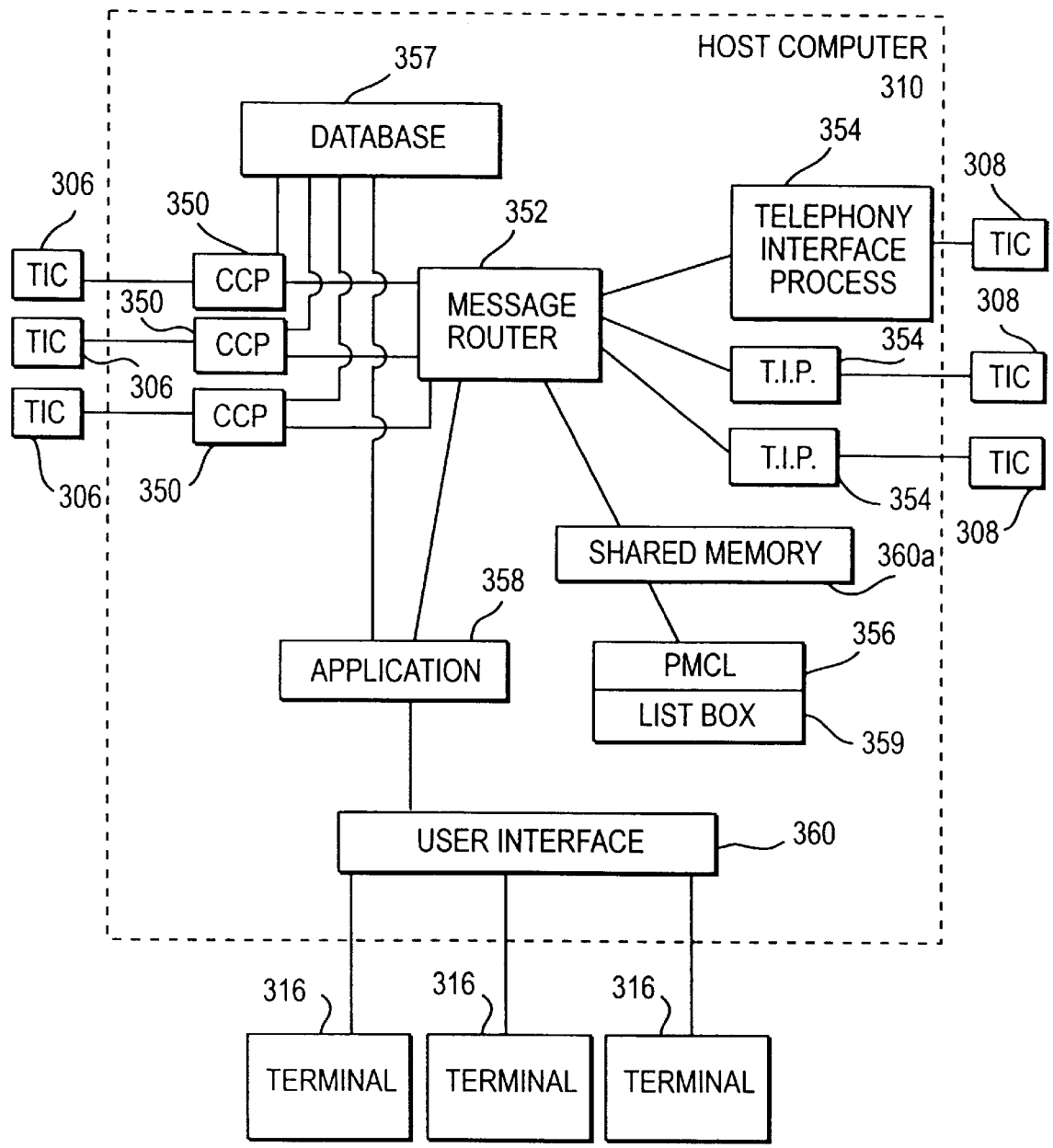
FIG. 6 shows a schematic of the software processes of the second embodiment of the invention and shows the communication links and other connections between the processes of the system.

In another embodiment of the invention, the call distribution system is implemented without a network as illustrated in FIG. 5. The software used in this embodiment is illustrated in FIG. 6. In this embodiment, the incoming telephone lines 300 are received by the PBX 302. The PBX 302 initially connects incoming calls with the telephony interface cards 306, which are under the control of the CCP processes 350 running on the host computer 310. The CCP processes 350 send audible voice messages to the callers and receive digit responses from the callers through the telephone interface cards 306. The CCP processes 350 use the callers' digit responses to access pertinent information from the database 356. When the call is ready to be transferred to an agent's station 318, the CCP process 350 sends a message to the message router 352.

The message router 352 maintains an internal table describing the current state of each of the agent's telephone lines 320. In other embodiments, the functionality of the message router is limited to dispatching messages from one process to another. The message router 352 obtains the information for building this internal table from the telephone interface processes 354, which are autonomous processes running on the host computer 310 and which control the agent's lines 320. Whenever a telephony interface process 354 changes the state of the agent's telephone line 320, the telephone interface process 354 sends a message describing the new state of the line 320 to the message router 352.

Each telephony interface process 354 controls an agent's line 320 via a telephony interface card 308 connected to the PBX 302 with a telephone line configured according to analog protocols. Digital protocols, such as proprietary protocols or ISDN, can also be used. This is also true of the telephony interface device 306 where even T1 might be appropriate. The telephony interface card 308 is a device such as the telephony interface cards 62 and 76 described above in connection with the first embodiment. The interface between the telephony interface process 354 and the telephony interface card 308 is a digital signal processor message queue, as described above in connection with the first embodiment. The message router 352 and the telephony interface process 354 receive messages from the agents via the presentation manager control (PMCL) process 356 and the Listbox routines 359. The types of messages include a message indicating the agent is ready to receive calls, a message indicating the agent will answer a proffered call, requests to transfer a call, accepting a transferred call, requests for information from the database 357 and others. The agent sends a message by pressing the return key while the cursor is over the appropriate item in the user interface 360. The key press and cursor location are sent to the Listbox routines 359 via an event queue maintained by the operating system of the host computer 310. The Listbox routines 359 use this information to determine what kind of message to send, and passes the agent's station location and an identification of the message to the PMCL process 356. The PMCL process 356 then formats the message and sends it to the message router 352 via shared memory 360, or a similar interprocess communication mechanism provided by the operating system running on the host computer 310. If the message is a request by the agent to make or terminate a call, or a request for some other change in the state of the agent's line 320 that can be initiated by the telephony interface card 308, the PMCL process 356 also sends the message to the telephony interface process 354, which passes the message along to the telephony interface card 308 via the DSP message queue as described above. If the message is an acceptance of a proffered call, the message router 352 sends a message to the CCP process 350 that is holding the call requesting that the CCP process 350 transfer the call to the agent's telephony interface card 308. The CCP process 350 accomplishes this act by posting a transfer message on the DSP message queue, which it shares with the telephony interface card 306. When the telephony interface card 306 receives the transfer message, it transfers the call using the flash and dialed digit transfer facility provided by the PBX 302. When the agent receives the call it can communicate with the caller via the agent's headset 312.

At the same time as the agent receives the call via its line 320, the agent can also view database information on its terminal 316. The database information will be specifically associated with the caller or the purpose of the call. For example, if the call relates to a bank loan, the database information will comprise current interest rates as well as credit information on the caller. The database information was acquired by the CCP process 350 and was sent to the message router 352 during the time the CCP process 350 processes of the transfer message. The message router 352 then sends the database information to the application 358 which formats the information for display and displays the information on the terminal 318.

Figure 7:
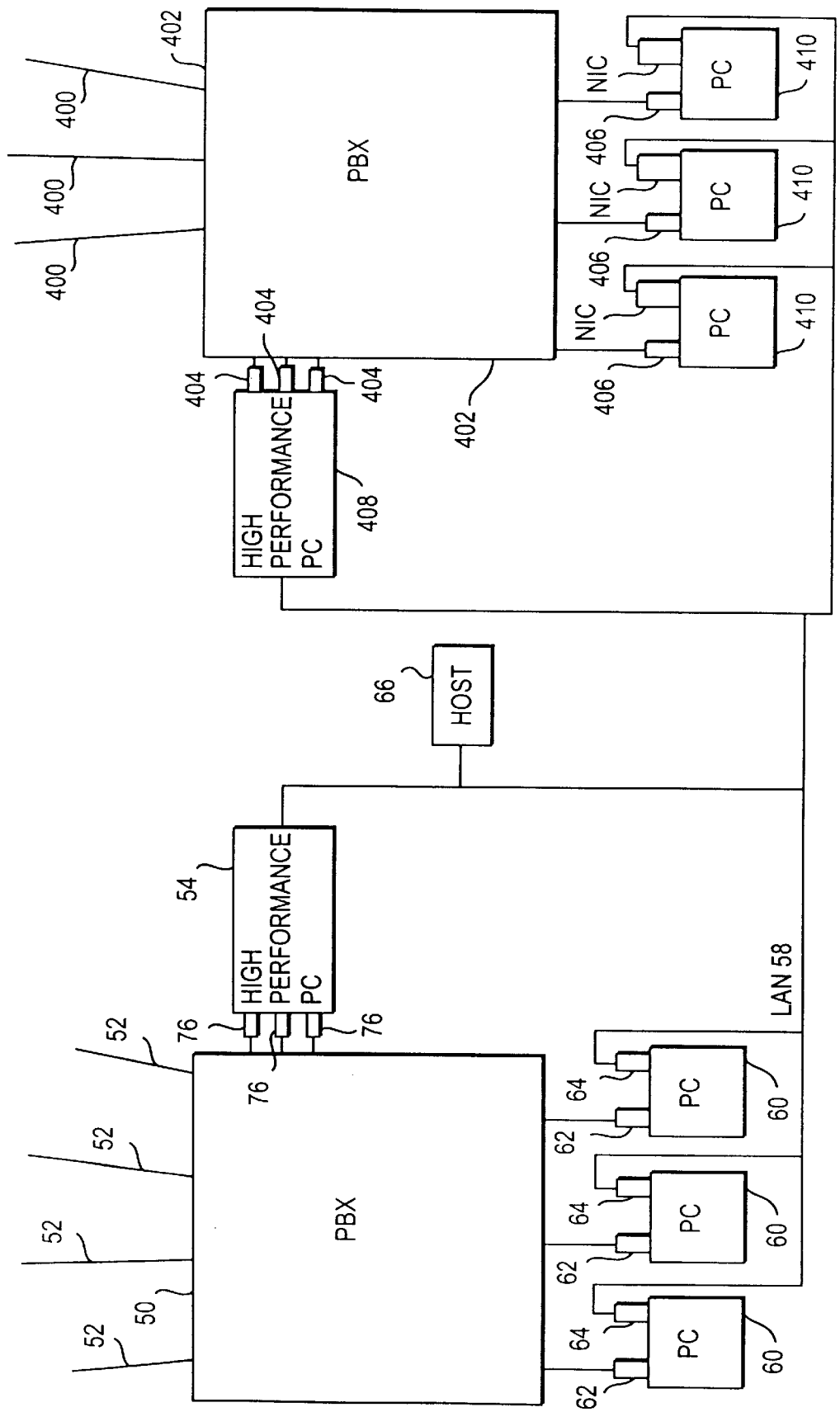
FIG. 7 shows a schematic of an embodiment of the invention comprising multiple PBXs and shows the hardware connections between the components of the system.

FIG. 7 shows another embodiment of the invention that includes the elements of the system of the first embodiment described above, as well as a second set of incoming telephone lines 400 that are serviced by a second PBX 402. The telephony interface cards 404 and 406, like the telephone interface cards 62 and 76 described in connection with the first embodiment, perform telephony functions such as making calls, receiving calls, and transferring calls. The telephony interface cards 402 are connected to a computer 408 that runs call control processes (CCPs) which are clones of the call control processes 254 running on the high performance PC 54. The computer 408 is also connected to the LAN 58, and the call control processes running on the computer 408 send messages over the LAN 58 to the message router 112 running on the high performance PC 54. Thus it can be seen that the message router 112 can run on any computer connected to the LAN 58 provided it can send messages to and receive messages from all call control processes 254, and all network interface threads 100.

The embodiment of the invention shown in FIG. 7 is also provided with PCs 410, each connected to the LAN 58 and each having telephony interface cards 406 as in the case of the PCs 60 associated with the first PBX 50. Using this embodiment of the invention, an establishment having multiple PBX's can use the call distribution system of the invention not only to provide the information stored on the host computer 66 to the PCs 410 running on the second PBX 402 but at the same time to transfer calls received over the telephone lines 52 to the agents using the PCs 410. Furthermore, an establishment having multiple PBX's but no tie trunks connecting them together can nevertheless integrate its entire telephone system as well as its information and data resources. The PBX 402 could be replaced by an automatic call distributor (ACD) provided the CCP processes running on the computer 408 anticipate the operation of the ACD's internal call distribution software when the CCP processes transfer or otherwise process a call.

Figure 8:
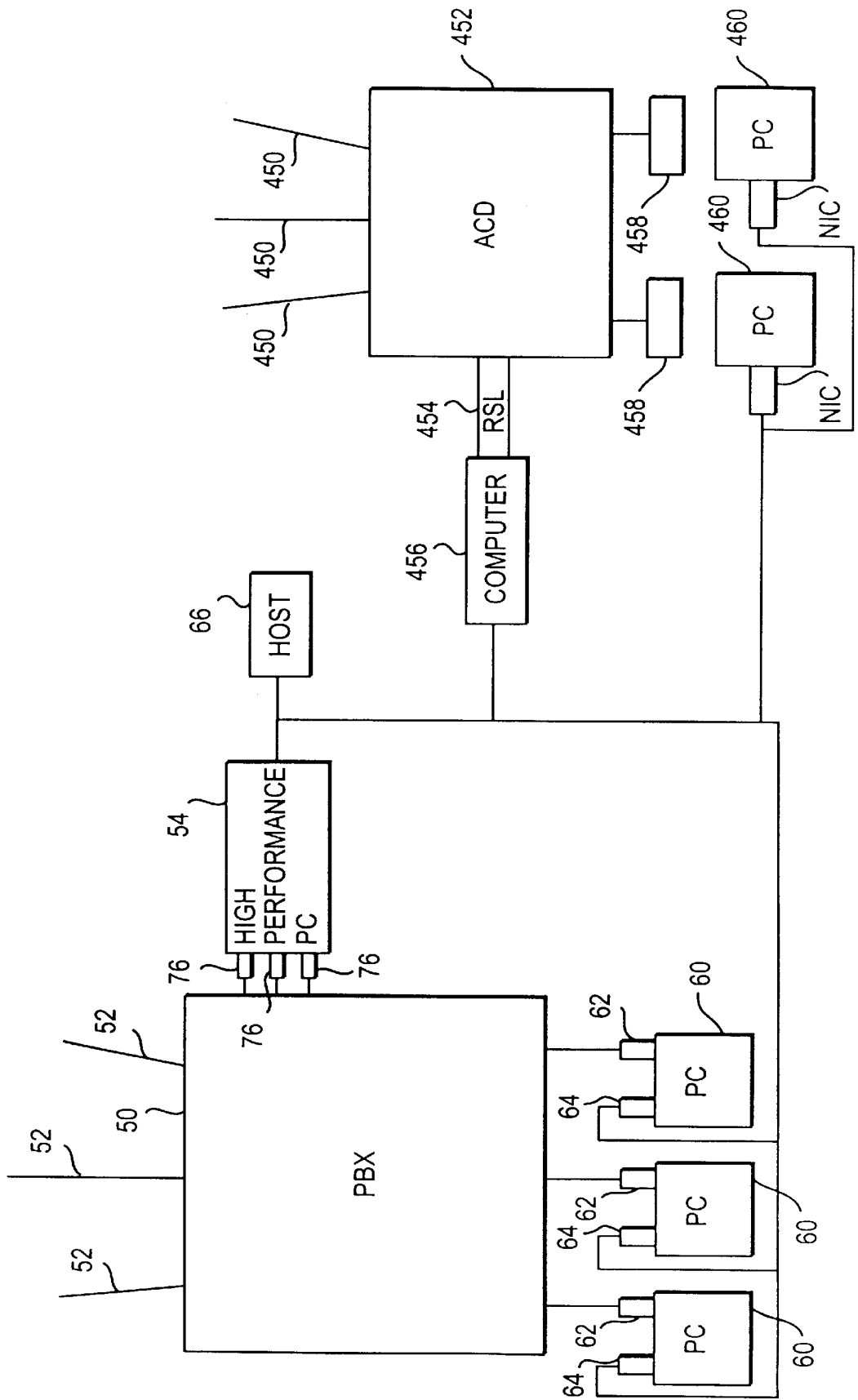
FIG. 8 shows a schematic of an embodiment of the invention comprising multiple ACDs and including an ACD employing an RSL, and shows the hardware connections between the components of the system.

The embodiment of the invention shown in FIG. 8 is similar to the embodiment of FIG. 7. However, it illustrates how the call distribution system of the present invention can easily and effectively incorporate complicated telephone systems such as those using RSL links. The incoming telephone lines 450 are received by the automatic call distributor 452. The computer 456 controls the distribution of incoming calls through the RSL 454. However, no reconfiguration of the application programs running on the host computer 66 is necessary. The message router 112, running on the high performance PC 54 provides the function of transferring the database information over the LAN 58 to an agent's personal computer 460. Simultaneously with its transfer of database information, the message router module 112 sends a message to the computer 456 requesting that it control the RSL 454 to effect a transfer of the call to the agent's telephone station equipment 458.

In one embodiment of the invention using a PBX and an ACD with an RSL connection, calls in the ACD's call queue are controlled by the CCP_ACD process. This process is similar in function to the CCP processes running on the high performance PCs, but it does not include the voice response activities of the CCP processes. The CCP_ACD process receives and sends control information to the ACD 452 over its RSL link 454 instead of controlling a telephony interface card. Any voice response functions take place before control of the call is passed to the CCP_ACD process by the CCP process (which occurs when WM_CALL is issued by the CCP). At that time the CCP process transfers the call into the ACD 452 and sends WM_CALL to its associated CCP_ACD process.

Between the CCP ACD processes and the RSL link 454 is a process called RSL_SERV. The RSL_SERV process receives messages from the CCP_ACD processes, converts these messages to the RSL format, and handles the transmission protocol over the RSL link 454. The RSL_SERV process also keeps a table containing associations between callers in the ACD 452 and each CCP_ACD process. In this way the control of the ACD 452 via the RSL link 454 is treated as if a telephony interface card were used, and the operation of the CCP_ACD process can be the same as the CCP processes 254 running on the high performance PC 54.

Agent work stations associated with the ACD 452 do not contain telephony interface cards. Their control messages are sent via their named pipes to a LCP_ACD process. In one embodiment of the invention the LCP_ACD processes reside on the computer 456 with the RSL_SERV process. The RSL_SERV process performs the same functions for the LCP_ACD process as it does for the CCP_ACD process. Throughout the system, the same message types are used to control the call processing. This makes it possible to interwork with agent work stations on other switching devices and on other parts of the network.

The invention is not limited to the embodiments described above but also includes configurations using different varieties of digital phone lines, analog phone lines or other configurations that are known to those having ordinary skill in the art. Furthermore, while many of the processes used in the present invention are implemented as software running on a general purpose computer, any portion or all of the present system could be implemented in hardware as a special-purpose chip or group of special purpose chips.

What is claimed is:

1. A call distribution system, comprising:
   a telephone line for transmitting telephony data related to a telephone call;
   a first computer having a first control process executing thereon for performing call control functions;
   a telephony interface card electrically connected to said first computer for providing telephony control functions to process said telephone call in accordance with control commands issued to said telephony interface card by said first control process;

a second computer having a second control process executing thereon for performing call control functions; and a computer network coupling said first computer to said second computer for sending a message between said first computer and said second computer, said message containing call-processing information.

2. The call distribution system of claim 1, further comprising:

an interprocess message dispatch system through which said message is transmitted between said first computer and said second computer over said computer network.

3. The call distribution system of claim 2, wherein said call-processing information comprises a status of said second computer.

4. The call distribution system of claim 1, wherein said call-processing information comprises call-related information.

5. The call distribution system of claim 4, wherein said first control process collects said call-related information.

6. The call distribution system of claim 5, wherein said first control process collects said call-related information interactively from a caller that placed said telephone call.

7. The call distribution system of claim 6, wherein said first control process stores said call-related information in a database.

8. The call distribution system of claim 6, where said first control process distributes said call-related information to said second computer via messages sent between said first and second control processes via said interprocess message dispatch system.

9. The call distribution system of claim 2, wherein said second computer further comprises:

a port to said interprocess message dispatch system through which said call-processing information corresponding to said telephone call is transmitted as an information message; and a display device for displaying said call-processing information to an agent using said second computer.

10. The call distribution system of claim 2, further comprising:

one or more additional telephone lines coupled to said telephony interface card to transmit telephony data corresponding to one or more additional telephone calls, wherein said telephony interface card holds said telephone call and said one or more additional telephone calls as held calls, and wherein said call-processing information includes information related to each of said telephone call and said one or more additional telephone calls;

a display device coupled to said second computer; and a queue displayed on said display device that contains an entry corresponding to one or more of said held calls, each such entry containing at least a portion of said call-processing information that is related to a unique one of said held calls.

11. The call distribution system of claim 10, further comprising:

one or more additional telephony interface cards electrically coupled to said first computer and telephonically coupled to one or more of said additional telephone lines.

12. The call distribution system of claim 11, wherein only one of said additional telephony interface cards is assigned to each of said one or more additional telephone lines.

13. The call distribution system of claim 10, wherein said second computer further comprises a selection device for allowing said agent to select one of said held calls by selecting an entry from said queue.

14. The call distribution system of claim 10, further comprising means for displaying each entry sorted according to length of time said held calls have been held.

15. The call distribution system of claim 10, further comprising means for displaying each entry sorted according to a predetermined priority.

16. The call distribution system of claim 1, wherein said first computer further comprises:

means for maintaining a current status for one or more telephone calls being processed by said second computer, wherein said current status is passed to said first computer by said second computer in a message through said interprocess message dispatch system.

17. The call distribution system of claim 16, further comprising:

means for distributing said telephone call and call-related information associated with said telephone call in accordance with said current status.

18. The call distribution system of claim 4, wherein said second computer further comprises:

a display device for displaying said call-related information to an agent operating said second computer; and selection means for allowing said agent to select a call based on said displayed call-related information.

19. The call distribution system of claim 2, wherein said call-processing information includes call-related information, and wherein said second computer further comprises:

a display device for displaying said call-related information to an agent operating said second computer;

selection means for allowing said agent to select a call as a selected call based on said call-related information displayed; and a message port coupled to said interprocess message dispatch system for sending a message to said first control process requesting said first computer to transfer control of said selected call to said second computer along with other data associated with said selected call.

20. The call distribution system of claim 1, wherein said call control functions comprise a function for distributing telephone calls and associated data to an agent.

21. A method for distributing telephone calls, comprising the steps of:

receiving a plurality of telephone calls;

determining call-processing information corresponding to each of said plurality of telephone calls;

sending messages containing said call-processing information over an interprocess message dispatch system from a control computer to one or more agent computers, each agent computer having a display device coupled thereto;

creating a queue having entries corresponding to one or more of said telephone calls, each entry containing at least a portion of said call-processing information;

sorting said telephone calls according to a sorting criterion; and displaying said queue of said telephone calls sorted in accordance with said sorting step to one or more agents.

22. The method of claim 21, wherein said determining step comprises the step of obtaining call-related information concerning said telephone calls.

23. The method of claim 22, further comprising the step of selecting a telephone call as a selected telephone call from said queue on the basis of said call-related information.

24. The method of claim 23, further comprising the step of transferring the selected telephone call in accordance with said selecting step.

25. The method of claim 24, further comprising the step of synchronizing the transfer of said call-related information in accordance with said selecting step when said selected telephone call is transferred to said selecting agent.

26. The method of claim 25, further comprising the step of passing said call-related information over said interprocess message dispatch system from a first control process executing on said control computer through a named pipe to one or more of said agent computers.

27. The method of claim 24, further comprising the step of providing access to information associated with said selected telephone call in accordance with said selecting step.

28. The method of claim 21, wherein said sorting step comprises the step of sorting according to a predetermined sorting criterion.

29. The method of claim 21, wherein said sorting step comprises the step of sorting said calls according to said call-processing information.

30. The method of claim 21, wherein said sorting step comprises the step of sorting said calls according to said call-related information.

31. A call distribution system, comprising:
   a telephone line for transmitting a telephone call;
   a computer coupled to said telephone line for performing call control functions on said telephone call;
   an interprocess message dispatch system executing on said computer over which information related to said telephone call is sent to an agent computer operated by an agent;
   a telephone call queue having an entry containing at least a portion of said information; and
   a display device coupled to said agent computer to display said telephone call queue to said agent.

32. The call distribution system of claim 31, further comprising a control process to collect said information.

33. The call distribution system of claim 31, further comprising a filter process executing on said computer to selectively display a portion of said telephone call queue to said agent.

34. The call distribution system of claim 31, wherein said information is sent to said agent computer over said interprocess message dispatch system, at least a portion of which is stored in said telephone call queue, and automatically appears on said display device when received by said agent computer.

35. The call distribution system of claim 31, further comprising:
   one or more additional agent computers, each operated by an agent; and
   an additional display device for each of said one or more additional agent computers on which to display at least a portion of said telephone call queue.

36. The call distribution system of claim 31, wherein said agent computer further comprises:
   a selection means by which the agent selects a particular call for further processing based on said displayed telephone call queue.

37. The call distribution system of claim 36, wherein said selection means causes a call control message to be passed over said interprocess message dispatch system to said control computer instructing said control computer to transfer control of said particular call to the agent.

38. The call distribution system of claim 31, further comprising a database subsystem to store said information and wherein said interprocess message dispatch system sends messages to said database subsystem to store at least a portion of said information therein, or to receive at least a portion of said information therefrom for display on said display device in said telephone call queue.

39. A method for distributing a telephone call in a call distribution system, comprising the steps of:
   receiving the telephone call;
   constructing a telephone call queue, having one entry for each telephone call received by the call distribution system, wherein each entry comprises information related to a particular telephone call received by the telephone call distribution system;
   adding an entry to said telephone call queue comprising information related to the telephone call; and
   providing an agent access to said to said telephone queue.

40. The method of claim 39, further comprising the step of selecting the telephone call for further processing from said telephone call queue.

41. The method of claim 39, further comprising the step of displaying said list to said agent as a queue.

42. The method of claim 41, further comprising the steps of:
   selecting the telephone call from said telephone call queue based on said entry added in said adding step; and
   transferring control of processing of the telephone call in accordance with said selecting step.

43. The method of claim 39, further comprising the steps of:
   retrievable storing at least a portion of said information in a database subsystem as stored information;
   sending a message containing a query to said database system to extract at least a portion of said stored information;
   receiving a message containing at least a portion of said stored information from said database subsystem; and
   constructing an entry in said queue using at least a portion of said stored information contained in said message.

44. A call distribution system for use in a call center, comprising:
   a computer;
   a first telephony interface device electrically coupled to said computer to receive a telephone call and to control processing of said telephone call until said telephone call is transferred;
   a call control process executing on said computer to send call control commands to said first telephony interface device to control processing of said telephone call;
   at least one agent computer;
   an additional telephony interface device electrically coupled to each said at least one agent computer to process said telephone call;
   a line control process executing on each said at least one agent computer to control the telephony interface device coupled to that agent computer by sending call control commands to the telephony interface device to process said telephone call; and
   a computer network electronically coupling said computer and said at least one agent computer for passing a message from each said line control process to said call control process to coordinate processing of said telephone call.

45. The system of claim 44, wherein said message is a call control message.

46. The system of claim 44, wherein said message is a data message comprising call-related information.

47. The call distribution system of claim 44, further comprising:
   a message router;
   a first port coupling said call control process to said message router; and
   a second port coupling said line control process to said message router.

48. The call distribution system of claim 44, wherein said first telephony interface device collects information related to said telephone call, further comprising:
   a database subsystem for storing said information; and
   an interprocess message dispatch system to send a message containing a database query from said agent to database subsystem to obtain said information.

49. The call distribution system of claim 48, wherein said information comprises information pertaining to the purpose of said telephone call.

50. The call distribution system of claim 48, further comprising a queue for storing said information such that particular information relating to a particular call is accessible to an agent operating said at least one agent computer.

51. The call distribution system of claim 50, wherein there are one or more additional telephone calls to be processed, and wherein information related to each of said telephone call and said one or more additional telephone calls is stored as a separate entry in said queue.

52. The call distribution system of claim 50, wherein each said agent computer further comprises:
   a display device; and
   display means for displaying said queue on said display device such that said particular information is visually associated with the particular call to which it relates.

53. The call distribution system of claim 50, wherein said queue is sorted according to a length of time each call has been waiting.

54. The call distribution system of claim 50, wherein said queue is sorted according to a predetermined priority.

55. The call distribution system of claim 50, wherein said queue includes information indicating how long a call has been waiting.

56. The call distribution system of claim 50 wherein one of said line control processes sends a transfer request to said call control process and wherein said call control process transfers control of said telephone call to one of said additional telephony interface devices in response to an agent requesting a call to be transferred to said agent using said information displayed in said queue.

57. The call distribution system of claim 44, wherein said call control process automatically transfers control of a call to one of said additional interface devices.

58. The call distribution system of claim 48, wherein a transfer command is issued from one of said line control processes to said call control process over said computer network to transfer control of said telephone call from said first telephony device to the telephony interface device controlled by said one of said line control processes.

59. The call distribution system of claim 58, further comprising synchronization means for synchronizing transfer of said information with transfer of said telephone call, so that said information and said telephone call are transferred substantially simultaneously to the agent computer on which said one of said line control processes executes.

60. The call distribution system of claim 58, further comprising synchronization means for synchronizing transfer of said telephone call with transfer of information related to said telephone call such that said information is made accessible to the agent computer on which said one of said line control processes executes at substantially the time of said transfer.

61. The method of claim 21, further comprising the step of providing one or more of said agents access to data indicative of a current status of one or more other of said agents.

62. A method for distributing telephone calls, comprising the steps of:
   receiving a plurality of telephone calls;
   determining call-processing information corresponding to each of said plurality of telephone calls;
   sending messages containing said call-processing information over an interprocess message dispatch system from a link computer to one or more agent computers, each agent computer having a display device coupled thereto;
   sorting said telephone calls according to a sorting criterion;
   displaying a queue of said telephone calls sorted in accordance with said sorting step on each display device to one or more agents; and
   electronically coupling said one or more agents to each other so that each agent has access to data indicative of a current status of each other agent.

* * * * *